United States Patent
Takahashi et al.

[11] Patent Number: 5,923,268
[45] Date of Patent: Jul. 13, 1999

[54] UNIVERSAL TYPE REMOTE CONTROLLER

[75] Inventors: Shintaro Takahashi, Akishima; Hidehiro Ohashi, Kodaira; Satoshi Kimura, Sagamihara, all of Japan; Brian D. Towne, Aliso Viejo, Calif.

[73] Assignee: Kabushiki Kaisha Kenwood, Tokyo, Japan

[21] Appl. No.: 08/788,501

[22] Filed: Jan. 29, 1997

[51] Int. Cl.⁶ .................................................. G08C 17/02
[52] U.S. Cl. ........................... 340/825.69; 340/825.72; 340/870.25; 340/825.56; 340/825.22
[58] Field of Search .................... 340/825.69, 825.72, 340/870.25, 825.56, 825.22; 348/734

[56] References Cited

U.S. PATENT DOCUMENTS 4,825,200  4/1989  Evans et al. .................... 340/825.56
5,631,652  5/1997  Lee .................................. 340/870.25
5,745,068  4/1998  Takahashi et al. .............. 340/825.72

Primary Examiner—Brian Zimmerman
Assistant Examiner—Yves Dalencourt
Attorney, Agent, or Firm—Sixbey, Friedman, Leedom & Ferguson, P.C.; Gerald J. Ferguson, Jr.; Eric J. Robinson

[57] ABSTRACT

An improvement on a universal type remote controller having a plurality of target device modes corresponding in number to a plurality of devices to be controlled. In response to one key operation of a key on a keyboard, a microcomputer in one selected target device mode generates a main remote control signal and an additional remote control signal. The main remote control signal has a code format decodable by the target device, and the additional remote control signal has a code format decodable by a predetermined device other than the target device. The additional remote control signal is used for instructing the predetermined device to display the control contents of the target device.

3 Claims, 2 Drawing Sheets

UNIVERSAL TYPE REMOTE CONTROLLER

BACKGROUND OF THE INVENTION

1. Field of the Invention

The present invention relates to a universal type remote controller, and more particularly to a universal type, presettable remote controller which issues two or more different remote control signals in response to one key operation.

2. Related Background Art

A universal type remote controller can singularly control a plurality type of devices such as an amplifier, a video deck, a television set, and a CD player. If such devices are made by different manufacturers, the universal type remote controller is required to be preset so that it can transmit remote control signals of different code formats decodable by the respective devices. For example, a CD player manufactured by B Corp. can decode only a remote control signal of a code format specific to it. Therefore, in order to allow the remote controller to control the CD player, it is necessary to preset the remote controller so that it can transmit during a CD player mode a remote control signal having a specific code format.

The above mentioned conventional universal type remote controllers have become somewhat ubiquitous, coming as standard in higher end electronics equipment and as stand alone accessories. The concept is to give a consumer the capability to control various manufacturer's equipment from a single remote controller. This is beneficial, but limited, in that each component that can be controlled from the remote controller is viewed as a separate and discrete unit. This does not allow the consumer to set up an audio system that includes various manufacturer's equipment as a system in the true sense of the word. The consumer is not presented with a single method to receive feedback from one or possibly multiple locations. Visual feedback is limited to the display of the device being controlled at any given moment in time.

SUMMARY OF THE INVENTION

In the conventional universal remote situation described above, the remote controller only sends one data corresponding to the device that the controller is trying to control. In the new system, according to the present invention, the remote control is designed to send additional, "Display and Control" codes to a central controlling device, such as an amplifier, before sending the actual "Function" code to the target device, such as a CD player from another manufacturer. What is unique, is the concept of sending additional "Display and Control" data in conjunction with the traditional "Function" command, when a single button is pushed.

DETAILED DESCRIPTION OF THE PREFERRED EMBODIMENTS

Figure 1:
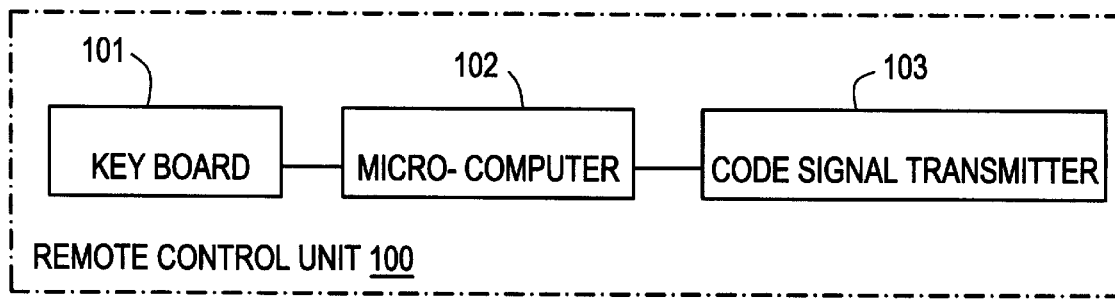
FIG. 1 shows the fundamental structure of a universal type, presettable remote controller according to an embodiment of the invention.

FIG. 1 shows the fundamental structure of a universal type, presettable remote controller 100 according to an embodiment of the invention. In response to a key operation of a keyboard 101, a microcomputer 102 generates a command having a code format decodable by a target device or component (e.g. a CD player), and a code signal transmitter 103 modulates an infrared ray with the command and transmits it as a remote control signal. A remote control signal decodable at a CD player is different for each manufacturer.

As will be later described, a user is required to first check what manufacturer make of each target device it is, and to then preset the remote controller so that the microcomputer 102 can generate a command having a code format decodable by the target device.

Figure 2:
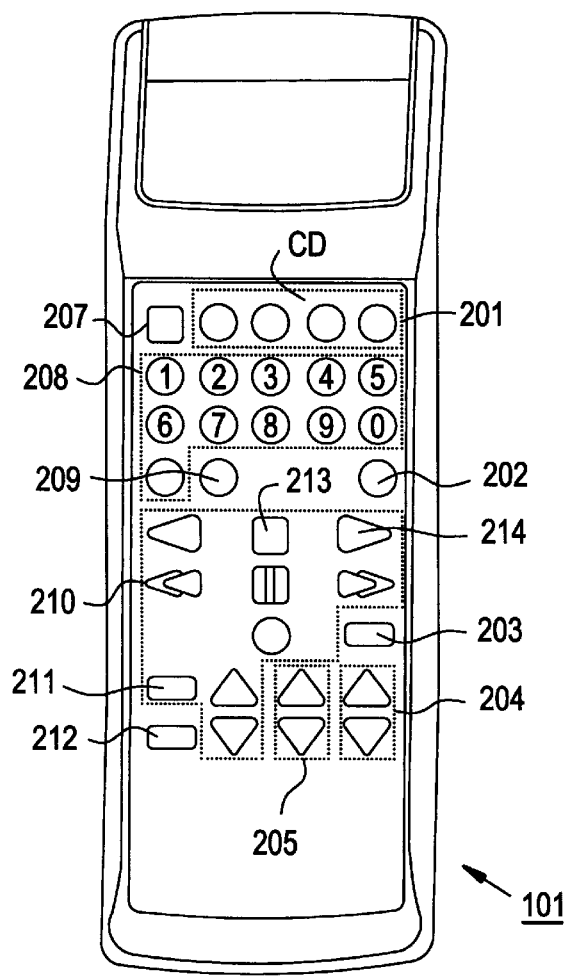
FIG. 2 shows an embodiment of a layout of a keyboard of the remoter controller shown in FIG. 1.
Figure 3:
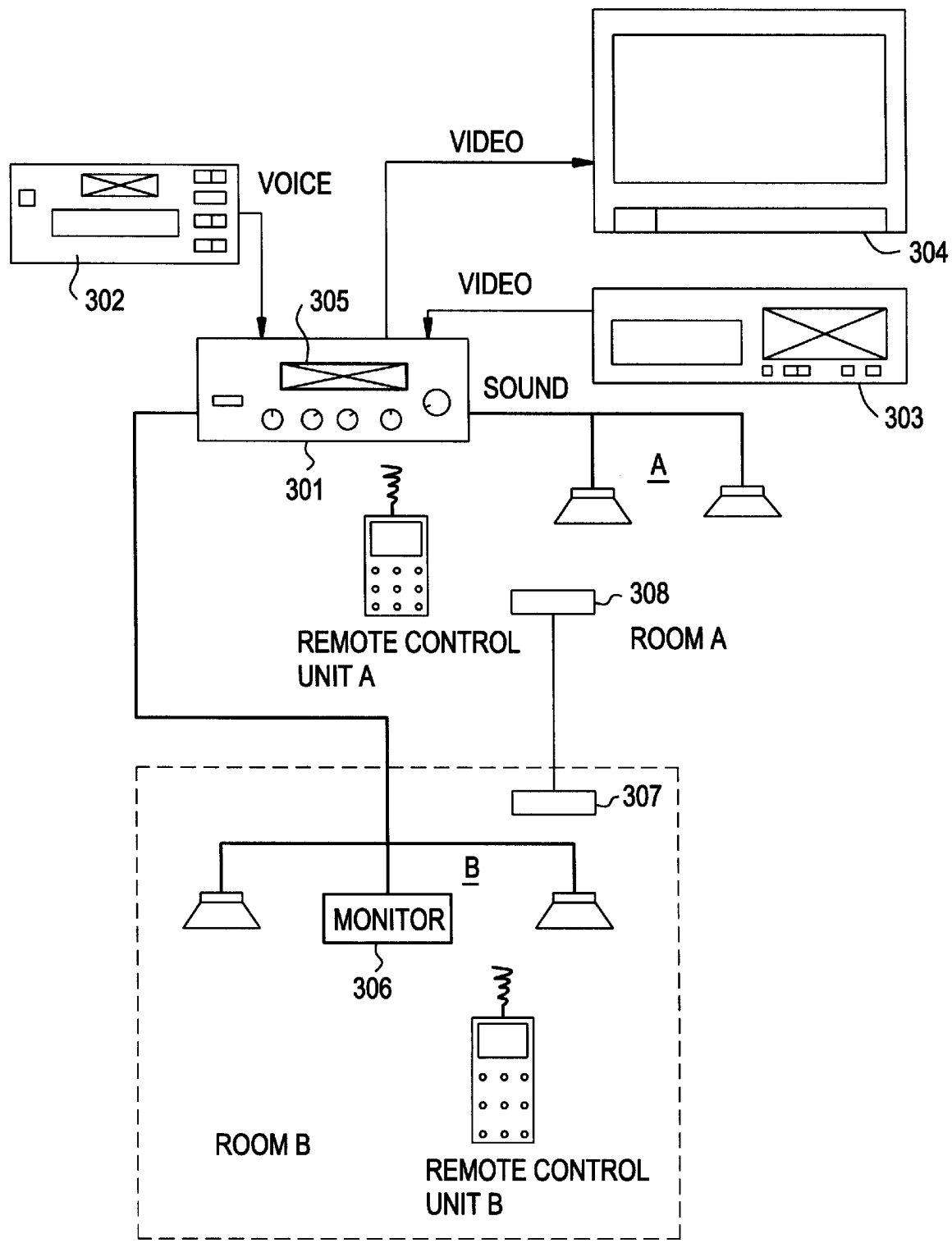
FIG. 3 shows an example of an audio/video system to be controlled by universal type, presettable remoter controllers.

FIG. 2 shows an embodiment of a key layout of the keyboard 101 of the remoter controller 100. For convenience of description of the key layout, an audio/video system 300 to be controlled by the remote controller 100 is used which is shown in FIG. 3. Connected to an amplifier 301 of A Corp. are a CD player 302 of B Corp, a video deck 303 of C Corp, and a television or monitor 304 of D Corp. Amplifier 301 has an input selection function of selecting one of devices connected thereto in response to a control by the remote controller 100. The selected device is set operable.

In keyboard 101 of FIG. 2, key group 201 includes component select keys AUDIO, VCR, CD, and TV/CABLE to select a component to be controlled by the remote controller. For example, when key CD is pressed, the remote controller generates a command signal to control CD player 302 as a target device. When a display key 202 is pressed, the name of a component which can be remote controlled currently is displayed on a display 206 for 5 seconds. A key 203 is a mute key to mute sound temporality. Keys 204 are volume keys to adjust the volume. By pressing input keys 205, the components are cyclically selected. A power key 207 is pressed to turn power on and off. Keys 208 are used as numeric keys for the controlled component. To achieve presetting, an enter key 209 is pressed when entering manufacturer codes. Operation keys 210 are used to operate the controlled component. The contents of operation vary depending on the controlled component. By pressing a surround key 212, the surround mode of the amplifier is selected. Stop key 213 is used to generate a remote control signal of stopping the operation for a target device. Play key 214 generates a remote control signal of starting the operation for a target device. Some of the above mentioned keys are irrelevant in explaining the present invention.

The universal type remote controller can control target devices made by different manufacturers. The remote controller 100 is required to generate a command having a code format decodable by a target device, for example, CD player 302 of B Corp connected to amplifier 301 shown in FIG. 3. To this end, a user is required to preset the remote controller 100.

Presetting is executed in the following manner. First, CD key of key group 201 is pressed to enter a CD mode. Then, enter key 209 is pressed and a four-digit numeric code (e.g., 1121) predetermined for each manufacturer is input by using numeric keys 208. Thereafter, enter key 209 is again pressed. In this manner, the remote controller can be preset so that microcomputer 102 can generate a remote control signal code decodable by connected CD player 302, in accordance with the input numeric code.

With reference to the system structure shown in FIG. 3, how this universal type remote controller is used, will be described. It is assumed that a user wants to stop CD player 302 and start reproduction by video deck 303 to produce sounds from speakers and display images on television 303. In this case, the remote controller 100 is operated as in the following.

(1) CD key of key group 201 is pressed to enter the CD mode, and thereafter stop key 213 is pressed to stop the operation of CD player 302.

(2) VCR key of key group 201 is pressed to enter a VCR mode to select an input from video deck (VCR) 303, and thereafter power key 207 is pressed to turn on video deck 303 and then play key 214 is pressed to start reproduction by VCR 303.

(3) TV/CABLE key of key group 201 is pressed to enter a TV mode, and thereafter power key 207 is pressed to turn on TV.

As described above, the universal type remote controller first enters an operation mode of a target device, and then generates a command having a code format decodable by the target device. According to the present invention, in response to one key operation during an operation mode of a target device, commands of two different code formats are generated. One code format is decodable by amplifier 301 as a central controlling device, and the other code format is decodable by the target device.

For example, if a user wants to again start reproduction by CD player 302, the user presses a reproduction start key of the remote controller 100 during the CD mode. In response to this, the microcomputer 102 generates first and second commands. The first command has a code format decodable by CD player 302 and is used for starting reproduction by CD player 302, and the second command has a code format decodable by amplifier 301 and is used for displaying "CD PLAY" on amplifier 301, and CD player 302 received the first command starts reproduction. Amplifier 301 received the second command displays an indication "CD PLAY" on its display screen 305 and/or monitors 304 and 306. According to the present invention, since the indication "CD PLAY" is displayed on display screen 305 of amplifier 301, a user can visually confirm that currently played music or the like is being reproduced by CD player 302. This "CD PLAY" can be output to monitors 304 and 306.

As shown in FIG. 3, amplifier 301 is connected to two speaker systems A and B which are installed in different rooms A and B. Amplifier 301 itself is assumed to be in room A. Users having remote controllers A and B are in rooms A and B, respectively. The infrared (IR) remote control signal generated from remote controller B is received at IR receiver 307 installed within room B. The received IR remote control signal is converted into an electrical signal at IR receiver 307 and transferred to IR transmitter 308 installed within room A. The electrical remote control signal is converted into IR signal at IR transmitter 308 to be transmitted as IR remote control signal to amplifier 301. The volume or the like of speaker systems A and B in rooms A and B can be independently controlled by remote controllers A and B. If a user in room A wants to increase the volume of speaker system A, remote controller A is controlled in the following manner. A function key 211 of keyboard 101 is pressed, and after the numeric keys are set to a shift mode, a room A key is pressed. After the remote controller 100 is set to a room A mode, a proper one of volume keys 204 is pressed. According to the present invention, in response to a press of the volume key, remote controller A sends two commands to amplifier 301, one being used for increasing the volume of speaker system A and the other being used for displaying an indication "ROOM A VOLUME UP" on display screen 305 and monitor TV 304. The user can confirm a proper operation from the indication "ROOM A VOLUME UP" on display screen 305 and monitor TV 304.

The remote controller of this embodiment also has an input select skip function. Presetting codes specific to manufacturers of devices connected to amplifier 301 are set during presetting. If UP-MODE key or DOWN-MODE key of input keys 205 is pressed a plurality of times, the modes are cyclically selected, for example, INPUT1→INPUT2→INPUT3→INPUT4→INPUT1→ . . . At the cyclically selected INPUT mode, the remote control unit 100 generates an input selection remote signal of indicating that the amplifier 301 switches its input to the selected INPUT. In the remote controller of this embodiment, for example, if video deck VCR 303 and television TV/CABLE 304 are not connected to INPUT2 and INPUT4 of amplifier 301 and presetting codes are not set to VCR and TV/CABLE for INPUT2 and INPUT4, the cyclic indication in response of presses of one of input keys 205 becomes INPUT1→INPUT3→INPUT1→INPUT3→ . . . to skip INPUT2 and INPUT4.

The invention has been described in connection with the above preferred embodiments. The invention is not limited only to the above embodiments, but various modification are possible without departing from the scope of the appended claims.

The preset code such as 4 digits includes information for the name of a device to be preset. In the remote controller, the input renaming of the device which is actually connected to amplifier 301 is automatically derived from the preset code entered by the user. The remote controller puts the device name in the remote control signal. Accordingly, the amplifier 301 can displays on the display 305 and/or monitor 304 the name of device which is actually connected to the amplifier 301.

What is claimed is:

1. A remote controller including a keyboard, a microcomputer, and a remote control code signal transmitter, and having a plurality of target device modes corresponding in number to a plurality of devices to be controlled, the remote controller controlling each target device by entering a selected target device mode of the target device and generating a remote control signal for controlling the target device, wherein:

in response to one key operation of a key of said keyboard said microcomputer in the selected target device mode generates at least one main remote control signal and an additional remote control signal indicative of control contents of said main control signal, said main remote control signal having a code format decodable by the selected target device, and said additional remote control signal having a code format decodable by a predetermined device other than the selected target device, and said additional remote control signal is used for instructing said predetermined device to display the control contents of the target device.

2. A remote controller including a keyboard, a microcomputer, and a remote control code signal transmitter, and having a plurality of target device modes corresponding in number to a plurality of devices to be controlled, the remote controller controlling each target device by entering a selected target device mode of the target device and generating a remote control signal for controlling the target device, wherein:

said microcomputer stores a preset code entered from said keyboard for each of the plurality of target device modes and generates a remote control code format matching the stored preset code and an additional remote control code format matching a code indicative of control contents of the preset code, a code indicative of said additional remote control code format is used to display the control contents of the preset code on a display device;

said keyboard includes a key for generating an instruction signal to sequentially and cyclically select the plurality of target device modes and to generate an input selection remote control signal for each of the cyclically selected target device modes; and in response to said instruction signal, said microcomputer sequentially and cyclically select the plurality of target device modes by skipping a target device mode for which said specific preset code is not stored.

3. A remote controller according to claim 1, wherein said microcomputer stores a device name for the cyclically selected target device mode and the input selection remote control signal includes the stored device name for a display.

* * * * *